United States Patent
Yang (10) Patent No.: US 9,777,969 B2
(45) Date of Patent: Oct. 3, 2017

(54) PIPE MEMBER EQUIPPED WITH HEAT INSULATION CORE PIPELINE AND U-SHAPED ANNULARLY-DISTRIBUTED PIPELINE

(76) Inventor: Tai-Her Yang, Dzan-Hwa (TW)

( * ) Notice: Subject to any disclaimer, the term of this patent is extended or adjusted under 35 U.S.C. 154(b) by 1257 days.

(21) Appl. No.: 13/053,398

(22) Filed: Mar. 22, 2011

(65) Prior Publication Data

US 2011/0272054 A1    Nov. 10, 2011

Related U.S. Application Data (63) Continuation-in-part of application No. 12/588,779, filed on Oct. 28, 2009, now Pat. No. 9,103,603.

(51) Int. Cl.
| | | |
|---|---|---|
| *F28D 20/00* | (2006.01) | |
| *F24J 3/08* | (2006.01) | |
| *F28F 13/00* | (2006.01) | |

(52) U.S. Cl.
CPC .......... F28D 20/0052 (2013.01); F24J 3/083 (2013.01); *F28F 2013/005* (2013.01); *F28F 2270/00* (2013.01); *F28F 2275/02* (2013.01); *Y02E 10/125* (2013.01); *Y02E 60/142* (2013.01)

(58) Field of Classification Search
CPC ....... Y02E 10/125; Y02E 10/12; Y02E 10/18; Y02E 60/142; F24J 3/08; F24J 3/083; F28D 1/0475; F28D 7/024; F28D 7/02; F28D 7/04; F28D 1/0473; F28D 7/022; F28D 20/0052; F28F 2275/02; F28F 2270/00; F28F 2013/005

USPC ............... 165/45, 155; 166/57; 138/113; 60/641.2

See application file for complete search history.

(56) References Cited

U.S. PATENT DOCUMENTS

| | | | | |
|---|---|---|---|---|
| 4,741,388 | A | * | 5/1988 | Kuroiwa .................. 165/45 |
| 5,561,985 | A | * | 10/1996 | Cochran .................. 62/260 |
| 5,623,986 | A | * | 4/1997 | Wiggs ..................... 165/45 |
| 5,816,314 | A | * | 10/1998 | Wiggs et al. ............. 165/45 |
| 6,931,879 | B1 | * | 8/2005 | Wiggs ..................... 62/260 |
| 6,932,149 | B2 | * | 8/2005 | Wiggs ..................... 165/45 |
| 7,578,140 | B1 | * | 8/2009 | Wiggs ..................... 62/260 |
| 2002/0036076 | A1 | * | 3/2002 | Eastman ................. 165/45 |
| 2009/0025902 | A1 | * | 1/2009 | Favier et al. ............. 165/45 |

FOREIGN PATENT DOCUMENTS

FR    1467926 A  *  2/1967  .......... F28D 7/022

* cited by examiner

*Primary Examiner* — Tho V Duong
(74) *Attorney, Agent, or Firm* — Bacon & Thomas, PLLC (57) ABSTRACT

The present invention relates to a U-type piping capable of thermal energy transmission with each other in a radiate arrangement, wherein the piping segments of the U-type fluid piping inlet end and/or outlet end of the U-type piping capable of thermal energy transmission with each other in the radiate arrangement are directly made of thermal insulating materials, or a thermal insulating structure is installed between the inlet end and the outlet end, and a thermal conductive body made of thermal conductive material is further installed thereof, so as to prevent thermal energy loss because of thermal conduction by temperature difference between adjacent piping segments with temperature difference of the inlet end and the outlet end installed on the same side when fluid with temperature difference passing through.

8 Claims, 5 Drawing Sheets

PIPE MEMBER EQUIPPED WITH HEAT INSULATION CORE PIPELINE AND U-SHAPED ANNULARLY-DISTRIBUTED PIPELINE

CROSS-REFERENCE TO RELATED APPLICATION

This application is a Continuation-In-Part of my patent application Ser. No. 12/588,779, filed on Oct. 28, 2009.

BACKGROUND OF THE INVENTION (a) Field of the Invention

The present invention relates to a pipe member equipped with heat insulation core pipeline and U-shaped annularly-distributed pipeline for being installed within the thermal storage body (500) composed of natural thermal storage body, such as shallow surface of the earth, or pool, lake, river, ocean, or artificial objects in solid, or gaseous, or liquid state; wherein the pipe member equipped with heat insulation core pipeline and U-shaped annularly-distributed pipeline is constructed through that the piping segments of fluid inlet terminal and/or outlet terminal of the U-type core piping and loop piping are directly made of thermal insulating material, or thermal insulating structure is installed between the inlet terminal and the outlet terminal; so as to prevent thermal energy loss because of thermal conduction between adjacent piping segments of inlet terminal and outlet terminal on the same side when thermal conductive fluid with temperature difference passing through.

(b) Description of the Prior Art

Traditionally, thermal energy loss often occurs in U-type piping device of U-type piping heat exchanger, because of thermal conduction by temperature difference between adjacent piping segments of fluid inlet terminal and fluid outlet terminal installed on the same side when fluid with temperature difference passing through.

SUMMARY OF THE INVENTION

The present invention relates to a U-type pipeline capable of thermal energy transmission with each other in a radiate arrangement, wherein the piping segments of the U-type fluid piping inlet end and/or outlet end of the U-type piping capable of thermal energy transmission with each other in the radiate arrangement are directly made of thermal insulating materials, or a thermal insulating structure is installed between the inlet end and the outlet end; and the above piping system is installed within the thermal conductive body made of thermal conductive material; so as to prevent thermal energy loss because of thermal conduction by temperature difference between adjacent piping segments with temperature difference of the inlet end and the outlet end installed on the same side when fluid with temperature difference passing through.

DESCRIPTION OF MAIN COMPONENT SYMBOLS

100: U-type piping
101: First fluid inlet and outlet terminal
102: Second fluid inlet and outlet terminal
111: Thermal conductive fluid
200: Common piping
300: Columnar thermal conductive body
400: Thermal insulating device
500: Thermal storage body
600: U-type wavy piping structure
650: U-type wavy piping structure having central piping segment
700: Central piping segment of U-type spiral piping
800: U-type spiral piping structure
900: Piping segment of the second fluid inlet and outlet terminal (102) of the U-type spiral piping structure (800)
1101: Shared first fluid inlet and outlet terminal
1011: Piping segment of the first fluid inlet and outlet terminal (101)
1022: Piping segment of the second fluid inlet and outlet terminal (102)

DETAILED DESCRIPTION OF THE PREFERRED EMBODIMENTS

The present invention relates to a pipe member equipped with heat insulation core pipeline and U-shaped annularly-distributed pipeline for being installed within the thermal storage body (500) composed of natural thermal storage body, such as shallow surface of the earth, or pool, lake, river, ocean, or artificial objects in solid, or gaseous, or liquid state; wherein the pipe member equipped with heat insulation core pipeline and U-shaped annularly-distributed pipeline is constructed through that the piping segments of fluid inlet terminal and/or outlet terminal of the U-type core piping and loop piping are directly made of thermal insulating material, or thermal insulating structure is installed between the inlet terminal and the outlet terminal; so as to prevent thermal energy loss because of thermal conduction between adjacent piping segments of inlet terminal and outlet terminal on the same side when thermal conductive fluid with temperature difference passing through.

As for the pipe member equipped with heat insulation core pipeline and U-shaped annularly-distributed pipeline of the present invention, each of the U-type piping (100) is used for passing through one or more following thermal conductive fluid (111), including for passing through:
1) liquid state fluid;
2) gaseous state fluid;
3) liquid to gaseous state fluid; and
4) gaseous to liquid state fluid.

Figure 1:
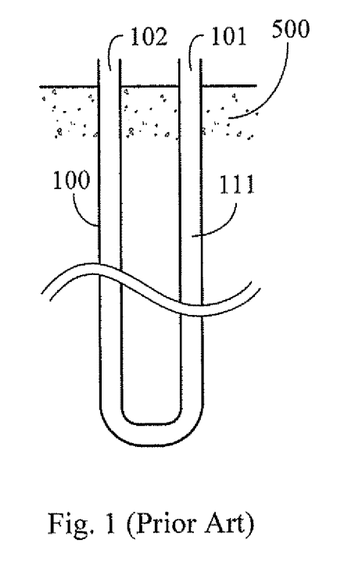
FIG. 1 shows an embodiment of conventional U-type piping (100) installed within the thermal storage body (500)

Traditionally, thermal energy loss often occurs in U-type piping device of U-type piping heat exchanger, because of thermal conduction by temperature difference between adjacent piping segments of fluid inlet terminal and fluid outlet terminal installed on the same side when fluid with temperature difference passing through, which is illustrated by examples as followings:

FIG. 1 shows an embodiment of conventional U-type piping (100) installed within the thermal storage body (500); when the thermal conductive fluid (111) passing through the piping segment of the first fluid inlet and outlet terminal (101) and the adjacent piping segment of the second fluid inlet and outlet terminal (102) respectively installed on the same side of the U-type piping (100) are in temperature difference, the two piping segments will produce thermal conduction and therefore result in thermal energy loss.

Figure 2:
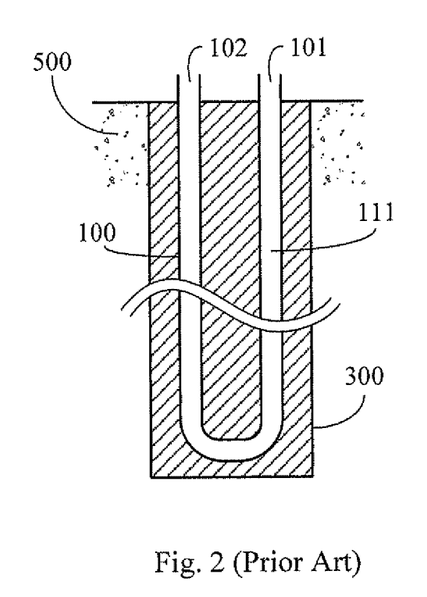
FIG. 2 shows an embodiment of conventional U-type piping (100) installed within the columnar thermal conductive body (300), wherein the columnar thermal conductive body (300) is placed within the thermal storage body (500)

FIG. 2 shows an embodiment of conventional U-type piping (100) installed within the columnar thermal conductive body (300), wherein the columnar thermal conductive body (300) is placed within the thermal storage body (500).

When the columnar thermal conductive body (300) is installed at the pipe member equipped with heat insulation core pipeline and U-shaped annularly-distributed pipeline of the thermal storage body (500) composed of natural thermal storage body, such as shallow surface of the earth, or pool, lake, river, ocean, etc, or artificial objects in solid, or gaseous, or liquid state, and the thermal conductive fluid (111) with temperature difference passes through the first fluid inlet and outlet terminal (101) and the second fluid inlet and outlet terminal (102) of the U-type piping, there will be thermal energy loss, because of thermal conduction between adjacent piping segments of the first fluid inlet and outlet terminal (101) and the second fluid inlet and outlet terminal (102) installed on the same side;

The present invention relates to a pipe member equipped with heat insulation core pipeline and U-shaped annularly-distributed pipeline for being installed within the thermal storage body (500) composed of natural thermal storage body, such as shallow surface of the earth, or pool, lake, river, ocean, etc, or artificial objects in solid, or gaseous, or liquid state; wherein the pipe member equipped with heat insulation core pipeline and U-shaped annularly-distributed pipeline is constructed through that the piping segments of the U-type fluid piping inlet terminal and/or outlet terminal, which are radial U-type pipelines for passing thermal energy through each other, are directly made of thermal insulating material, or thermal insulating structure is installed between the inlet terminal and the outlet terminal; so as to prevent thermal energy loss because of thermal conduction between adjacent piping segments of inlet terminal and outlet terminal on the same side when thermal conductive fluid with temperature difference passing through.

Figure 3:
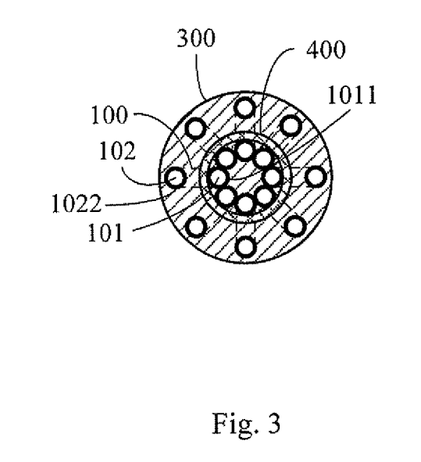
FIG. 3 is a structural schematic view showing that two or more radiate arranged U-type piping sections are installed within thermal conductive cylinder, and the thermal insulating structure is installed at where close to the peripheral of piping group with same flow direction which concentrates toward axial center, according to the present invention.

FIG. 3 is a structural schematic view showing that two or more radiate arranged U-type piping sections are installed within thermal conductive cylinder, and the thermal insulating structure is installed at where close to the peripheral of piping group with same flow direction which concentrates toward axial center, according to the present invention.

Figure 4:
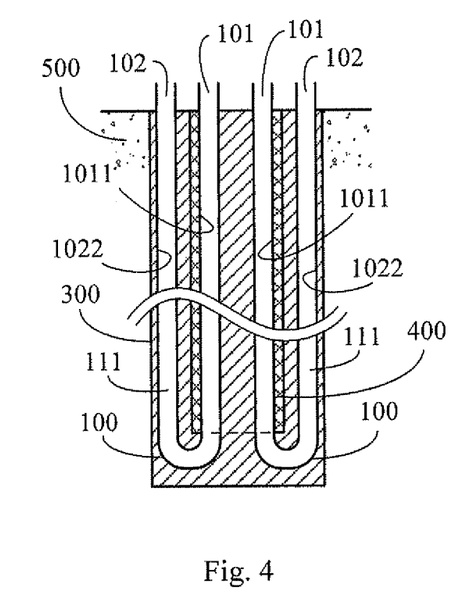
FIG. 4 is a section view of FIG. 3.

FIG. 4 is a section view of FIG. 3.

As shown in FIG. 3 and FIG. 4, the main components are as followings:
U-type piping (100): made of U-type tubular body for the thermal conductive fluid (111) passing through, wherein the U-type piping (100) is composed of a piping structure or used for being installed within the columnar thermal conductive body (300) composed of solid state or colloidal object; each of the U-type piping (100) has the first fluid inlet and outlet terminal (101) and the second fluid inlet and outlet terminal (102), the piping segments (1011) of the first fluid inlet and outlet terminal (101) are adjacently installed at the axial center of the columnar thermal conductive body (300) and sleeved with the thermal insulating device (400), and the piping segments (1022) of the second fluid inlet and outlet terminal (102) are radiate arranged along the axial direction and near the edge of the columnar thermal conductive body (300);

Thermal insulating device (400): related to thermal insulating structure constituted by the followings with thermal insulating effects, such as solid, flexible body, or foam, or enveloped colloid, gas, or liquid, or vacuum structure, for being provided to envelope the piping segments (1011) of the first fluid inlet and outlet terminal (101) of plural U-type piping (100), which are concentrated adjacent installed at the axial center of the columnar thermal conductive body (300), or the piping segments (1011) of the first fluid inlet and outlet terminal (101) are directly made of thermal insulating material or enveloped by thermal insulating material; by way of the above thermal insulating structure, the thermal energy loss caused by thermal conduction between the piping segments (1011) of the first fluid inlet and outlet terminal (101) and the piping segments (1022) of the second fluid inlet and outlet terminal (102) on the same side of the U-type piping (100) is substantially reduced;

The structure includes one or more than one of the following structural states:

1) Piping structure assembly: which is provided with two or more than two U-type piping in radiate arrangement, and the piping segments (1011) of the first fluid inlet and outlet terminals (101) of each U-type piping (100) are adjacently installed at the center of the piping structure assembly, and the thermal insulating device (400) is installed between the periphery of the piping segments (1011) of the first fluid inlet and outlet terminals (101) of each U-type piping, so as to configure the piping structure assembly;

2) Columnar structure enveloped by the columnar thermal conductive body (300): which is provided with the columnar thermal conductive body (300) made of thermal conductive material in various geometric cross section shapes such as round, oval, square, rectangular, or star-like shapes, for being served to envelope the U-type piping (100), and piping segments (1011) of plural first fluid inlet and outlet terminals (101) concentrated adjacent installed at the center of the piping structure, and the thermal insulating device (400) installed the periphery thereof, so, as to configure the columnar structure enveloped by the columnar thermal conductive body (300);

3) Columnar structure utilizing the columnar thermal conductive body (300) having piping therein as the structure member: which is directly made of the columnar thermal conductive body (300), and is configured in the structural state having piping therein for being provided with the piping segments (1011) of the first fluid inlet and outlet terminals (101) of each U-type piping concentrated adjacent installed at the center of the piping structure, and the bottom of the piping segments (1011) of the first fluid inlet and outlet terminals (101) are radiate connected to the piping segments (1022) of the second fluid inlet and outlet terminals (102) arranged nearby the periphery of the piping structure, and the thermal insulating device (400) is installed between the piping segments (1011) of the first fluid inlet and outlet terminals (101) of each U-type piping adjacently installed at the center of the piping structure and the thermal conductive body structure, so as to configure the columnar structure utilizing the columnar thermal conductive body (300) having piping therein as the structure member;

As for the pipe member equipped with heat insulation core pipeline and U-shaped annularly-distributed pipeline of the present invention, it further can have multiple sets of U-type piping jointly connected to the common piping (200) constituted by larger diameter piping installed at the axial center of the columnar thermal conductive body (300), the common piping (200) has a shared first fluid inlet and outlet terminal (1101), and be installed with the second fluid inlet and outlet terminal (102) in radiate arrangement along the axial direction of the columnar thermal conductive body (300).

Figure 5:
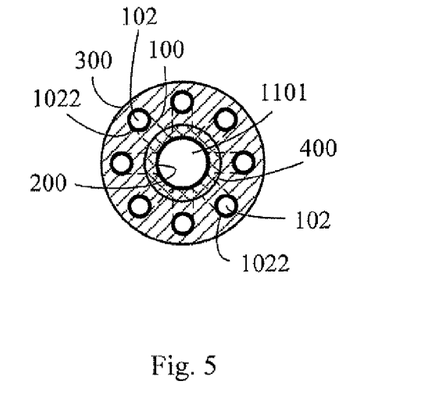
FIG. 5 is a structural schematic view of an embodiment showing that the bottom side of the multiple sets of U-type piping jointly connects to the bottom of the common piping (200), which is constituted by larger diameter piping and installed at the axial center of the columnar thermal conductive body (300), and the common piping (200) has the shared first fluid inlet and outlet terminal (1101), according to the present invention.

FIG. 5 is a structural schematic view of an embodiment showing that the bottom side of the multiple sets of U-type piping jointly connects to the bottom of the common piping (200), which is constituted by larger diameter piping and installed at the axial center of the columnar thermal conductive body (300), and the common piping (200) has the shared first fluid inlet and outlet terminal (1101), according to the present invention.

Figure 6:
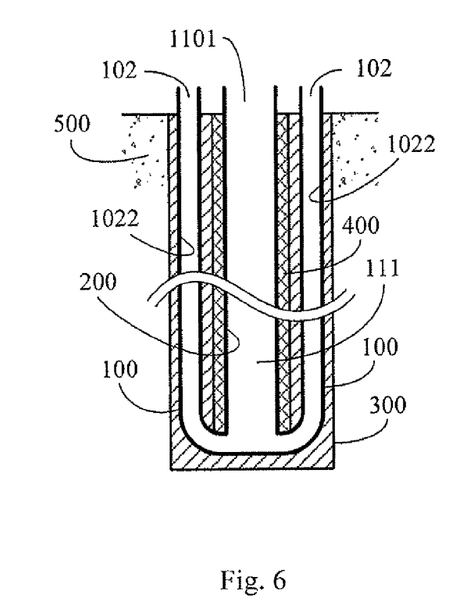
FIG. 6 is a section view of FIG. 5.

FIG. 6 is a section view of FIG. 5.

Figure 7:
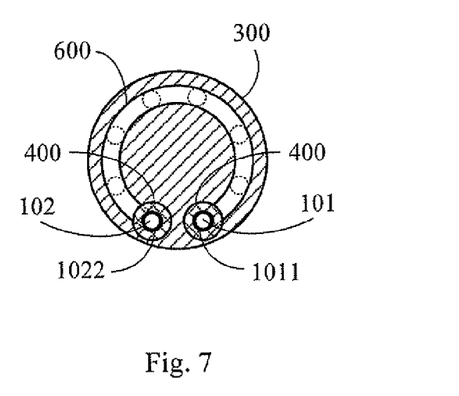
FIG. 7 is a schematic view of an embodiment, showing that the piping segments of the U-type wavy piping structure (600) arranged along the columnar periphery are arranged in a waved shape near the edge of the axial periphery of the columnar thermal conductive body (300), according to the present invention.

As shown in FIG. 5 and FIG. 6, it is mainly constituted by two or more than two U-type piping (100), the bottom side thereof are connected to the common piping (200) for the thermal conductive fluid (111) passing through, wherein each of the U-type piping (100) is composed of a piping structure or used for being installed in the columnar thermal conductive body (300) composed of solid state or colloidal object; the bottom side of each of the U-type piping (100) is jointly connected to the bottom of the common piping (200) which is constituted by larger diameter piping and installed at the axial center of the columnar thermal conductive body (300), and the top of the common piping (200) has a shared first fluid inlet and outlet terminal (1101), and the piping segments (1022) connecting to the second fluid inlet and outlet terminals (102) of each route of the U-type piping (100) are radiate arranged along the axial direction of the columnar thermal conductive body (300); said common piping (200) is installed at the axial center of the columnar thermal conductive body (300), and is further installed with the thermal insulating device (400) between the common piping (200) and the piping segments (1022) connecting to the second fluid inlet and outlet terminals (102) of each route of the U-type piping (100), and the piping segments (1022) connecting to the second fluid inlet and outlet terminals (102) of each route of the U-type piping (100) are respectively arranged near the edge of the axial periphery of the columnar thermal conductive body (300); and Thermal insulating device (400): related to thermal insulating structure constituted by the followings with thermal insulating effects, such as solid, flexible body, or foam, or enveloped colloid, gas, or liquid, or vacuum structure, for being installed between the piping segments (1022) connecting to the second fluid inlet and outlet terminals (102) of the U-type piping (100) and the common piping (200), or the common piping (200) is directly made of thermal insulating material or enveloped by thermal insulating material; by way of the above thermal insulating structure, thermal energy loss caused by thermal conduction between the piping segments of the common piping (200) and the second fluid inlet and outlet terminal (102) is reduced;

The structure includes one or more than one of the following structural states:

1) Piping structure assembly: which is provided with multiple sets of U-type piping (100) and the common piping (200) installed at the center of the piping structure assembly for connecting to the shared first fluid inlet and outlet terminal (1101), wherein the piping segments (1022) of the second fluid inlet and outlet terminals (102) are respectively arranged at the axial periphery of the piping structure assembly, and the bottom thereof is radiate distributed and connected to the bottom of the common piping (200), and the thermal insulating device (400) is installed between the piping segments (1022) of the second fluid inlet and outlet terminals (102) and the periphery of the common piping (200), so as to configure the piping structure assembly;

2) Columnar structure enveloped by the columnar thermal conductive body (300): which is provided with the columnar thermal conductive body (300) made of thermal conductive material in various geometric cross section shapes such as round, oval, square, rectangular, or star-like shapes, for being served to envelope the common piping (200) having the shared first fluid inlet and outlet terminal (1101), and to envelope the piping segments (1022) connecting to the second fluid inlet and outlet terminals (102), and the bottom of the common piping (200) is communicated with the bottom of the piping segments (1022) of the second fluid inlet and outlet terminals (102), and the thermal insulating device (400) is installed at the periphery of the common piping (200), so as to configure the columnar structure enveloped by the columnar thermal conductive body (300);

3) Columnar structure utilizing the columnar thermal conductive body (300) having piping therein as the structure member: which is directly made of the columnar thermal conductive body (300), and configured in the structural state having piping therein for being installed with the common piping (200) for connecting to the shared first fluid inlet and outlet terminal (1101), and installed with the thermal insulating device (400), so as to configure the columnar structure utilizing the columnar thermal conductive body (300) having piping therein as the structure member;

FIG. 7 is a schematic view of an embodiment, showing that the piping segments of the U-type wavy piping structure (600) arranged along the columnar periphery are arranged in a waved shape near the edge of the axial periphery of the columnar thermal conductive body (300), according to the present invention.

Figure 8:
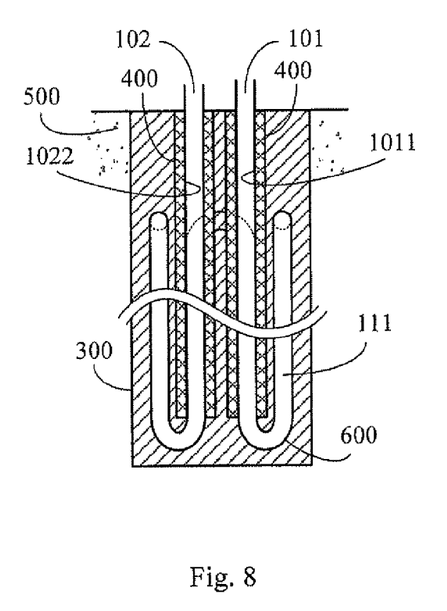
FIG. 8 is a section view of FIG. 7.

FIG. 8 is a section view of FIG. 7.

Figure 9:
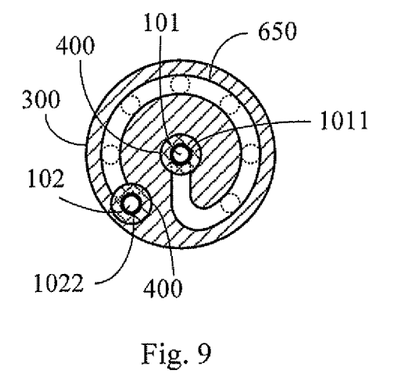
FIG. 9 is a schematic view of an embodiment in the U-type wavy piping structure having central piping segment (650), in which the piping segment (1011) of the first fluid inlet and outlet terminal (101) in the U-type wavy piping structure having central piping segment (650) is installed near the axial center of the columnar thermal conductive body (300), and the piping segment (1022) of the second fluid inlet and outlet terminal (102) is installed near the periphery of the columnar thermal conductive body (300), and the U-type wavy piping structure having central piping segment (650) between the two piping segments is arranged in a waved shape near the edge of the axial periphery of the columnar thermal conductive body (300) along the axial direction, according to the present invention.

As shown in FIG. 7 and FIG. 8, the main components are as followings:

U-type wavy piping structure (600): made of U-type wavy pipe body for the thermal conductive fluid (111) passing through, wherein the U-type wavy piping structure (600) is composed of a wave piping structure or used for being installed within the columnar thermal conductive body (300) composed of solid state or colloidal object; the U-type wavy piping structure (600) is placed in a waved shape around the periphery of the columnar thermal conductive body (300) and upper and lower wavy bended along the axial direction, and the both ends of the U-type wavy piping structure (600) have the piping segment (1011) of the first fluid inlet and outlet terminal (101) and the piping segment (1022) the second fluid inlet and outlet terminal (102) which are interlinked;

Thermal insulating device (400): related to thermal insulating structure constituted by the followings with thermal insulating effects, such as solid, flexible body, or foam, or enveloped colloid, gas, or liquid, or vacuum structure, for being provided to envelope the periphery of both or one of the piping segment (1011) for connecting to the first fluid inlet and outlet terminal (101) and the piping segments (1022) for connecting to the second fluid inlet and outlet terminal (102) of U-type wavy piping structure (600) is installed at the periphery of the columnar thermal conductive body (300), or both or one of the two piping segments are directly made of thermal insulating material or enveloped by thermal insulating material; by way of the above thermal insulating structure, the thermal energy loss caused by thermal conduction between the piping segment (1011) of the first fluid inlet and outlet terminal (101) and the piping segment (1022) of the second fluid inlet and outlet terminal (102) installed nearby on the U-type wavy piping structure (600) is substantially reduced;

The structure includes one or more than one of the following structural states:

1) Piping structure assembly: which is provided with the U-type wavy piping structure (600) arranged at the columnar periphery along the piping structure assembly, and the piping segment (1011) of the first fluid inlet and outlet terminal (101) and the piping segment (1022) of the second fluid inlet and outlet terminal (102) installed at two ends of the U-type wavy piping structure (600), and the thermal insulating device (400) installed on both or one of the two piping segments, so as to configure the piping structure assembly;

2) Columnar structure enveloped by the columnar thermal conductive body (300): which is provided with the columnar thermal conductive body (300) made of thermal conductive material in various geometric cross section shapes such as round, oval, square, rectangular, or star-like shapes, for being served to envelope the U-type wavy piping structure (600) arranged around the columnar periphery, and to envelope the piping segment (1011) of the first fluid inlet and outlet terminal (101) and the piping segment (1022) of the second fluid inlet and outlet terminal (102) installed at two ends of the U-type wavy piping structure (600), as well as to envelope the thermal insulating device (400) installed on the two or at least one of the two piping segments, so as to configure the columnar structure enveloped by the columnar thermal conductive body (300);

3) Columnar structure utilizing the columnar thermal conductive body (300) having piping therein as the structure member: which is directly made of the columnar thermal conductive body (300), and configured in the structural state having piping therein for being installed with the U-type wavy piping structure (600) arranged around the columnar thermal conductive body, including the piping segment (1011) of the first fluid inlet and outlet terminal (101) and the piping segment (1022) of the second fluid inlet and outlet terminal (102) installed at two ends of the U-type wavy piping structure (600), and the thermal insulating device (400) installed between the piping segment (1011) of the first fluid inlet and outlet terminal (101)

and the piping segment (1022) of the second fluid inlet and outlet terminal (102) and the thermal conductive body structure, so as to configure the columnar structure utilizing the columnar thermal conductive body (300) having piping therein as the structure member;

FIG. 9 is a schematic view of an embodiment in the U-type wavy piping structure having central piping segment (650), in which the piping segment (1011) of the first fluid inlet and outlet terminal (101) in the U-type wavy piping structure having central piping segment (650) is installed near the axial center of the columnar thermal conductive body (300), and the piping segment (1022) of the second fluid inlet and outlet terminal (102) is installed near the periphery of the columnar thermal conductive body (300), and the U-type wavy piping structure having central piping segment (650) between the two piping segments is arranged in a waved shape near the edge of the axial periphery of the columnar thermal conductive body (300) along the axial direction, according to the present invention.

Figure 10:
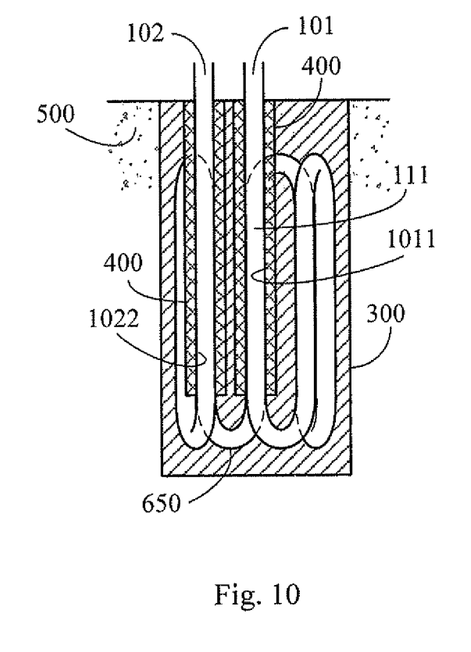
FIG. 10 is a section view of FIG. 9.

FIG. 10 is a section view of FIG. 9.

Figure 11:
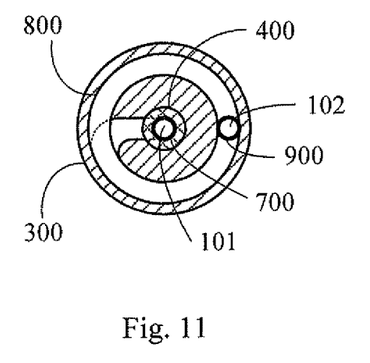
FIG. 11 is a schematic view of an embodiment, showing that the spiral piping segment of the first fluid inlet and outlet terminal (101) and the second fluid inlet and outlet terminal (102) in the U-type spiral piping is spirally arranged near the edge of the axial periphery of the columnar thermal conductive body (300), according to the present invention.

As shown in FIG. 9 and FIG. 10, the main components are as followings:

U-type wavy piping structure having central piping segment (650): made of U-type wavy pipe body for the thermal conductive fluid (111) passing through, wherein the U-type wavy piping structure having central piping segment (650) is composed of a wavy piping structure having central piping segment or used for being installed within the columnar thermal conductive body (300) composed of solid state or colloidal object; the U-type wavy piping structure having central piping segment (650) is placed in a waved shape around the periphery of the columnar thermal conductive body (300) and upper and lower wavy bended along the axial direction, and the both ends of the U-type wavy piping structure having central piping segment (650) have the piping segment (1011) of the first fluid inlet and outlet terminal (101) and the piping segment (1022) of the second fluid inlet and outlet terminal (102) which are interlinked, in which the piping segment (1011) of the first fluid inlet and outlet terminal (101) is placed near the center of the columnar thermal conductive body (300), the piping segment (1022) of the second fluid inlet and outlet terminal (102) is placed near periphery of the columnar thermal conductive body (300), and the U-type wavy piping structure having central piping segment (650) between the two piping segments is arranged in a waved shape near the edge of the periphery of the columnar thermal conductive body (300) along the axial direction;

Thermal insulating device (400): related to thermal insulating structure constituted by the followings with thermal insulating effects, such as solid, flexible body, or foam, or enveloped colloid, gas, or liquid, or vacuum structure, for being provided to envelope both or one of the periphery of the piping segment (1011) for connecting to the first fluid inlet and outlet terminal (101) and the piping segments (1022) for connecting to the second fluid inlet and outlet terminal (102) of U-type wavy piping structure having central piping segment (650) installed at the center and periphery of the columnar thermal conductive body (300), or both or one of the two piping segments are directly made of thermal insulating material or enveloped by thermal insulating material; by way of the above thermal insulating structure, thermal energy loss caused by thermal conduction between the piping segments (1011) of the first fluid inlet and outlet terminal (101) and the piping segments (1022) of the second fluid inlet and outlet terminal (102) installed nearby on the U-type wavy piping structure having central piping segment (650) is substantially reduced;

The structure includes one or more than one of the following structural states:

1) Piping structure assembly: which is provided with the U-type wavy piping structure having central piping segment (650) installed near the center and the columnar periphery, and the piping segment (1011) of the first fluid inlet and outlet terminal (101) and the piping segment (1022) of the second fluid inlet and outlet terminal (102) of the U-type wavy piping structure having central piping segment (650), and the thermal insulating device (400) installed on the two or at least one of the two piping segments, so as to configure the piping structure assembly;

2) Columnar structure enveloped by the columnar thermal conductive body (300): which is provided with the columnar thermal conductive body (300) made of thermal conductive material in various geometric cross section shapes such as round, oval, square, rectangular, or star-like shapes, for being served to envelope the U-type wavy piping structure having central piping segment (650), and to envelope the piping segment (1011) of the first fluid inlet and outlet terminal (101) and the piping segment (1022) of the second fluid inlet and outlet terminal (102) installed at two ends of the U-type wavy piping structure having central piping segment (650), as well as to envelope the thermal insulating device (400) installed on the two or at least one of the two piping segments, so as to configure the columnar structure enveloped by the columnar thermal conductive body (300);

3) Columnar structure utilizing the columnar thermal conductive body (300) having piping therein as the structure member: which is directly made of the columnar thermal conductive body (300), and configured in the structural state having piping therein for being installed with the U-type wavy piping structure having central piping segment (650) arranged along the columnar thermal conductive body, including the piping segment (1011) of the first fluid inlet and outlet terminal (101) and the piping segment (1022) of the second fluid inlet and outlet terminal (102) installed at two ends of the U-type wavy piping structure having central piping segment (650), and the thermal insulating device (400) installed between the thermal conductive body and both or one of the piping segment (1011) of the first fluid inlet and outlet terminal (101) and the piping segment (1022) of the second fluid inlet and outlet terminal (102), so as to configure the columnar structure utilizing the columnar thermal conductive body (300) having piping therein as the structure member;

FIG. 11 is a schematic view of an embodiment, showing that the spiral piping segment of the first fluid inlet and outlet terminal (101) and the second fluid inlet and outlet terminal (102) in the U-type spiral piping is spirally arranged near the edge of the axial periphery of the columnar thermal conductive body (300), according to the present invention.

Figure 12:
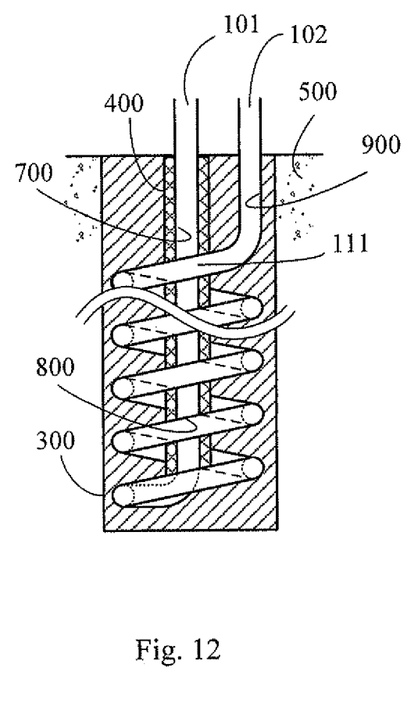
FIG. 12 is a section view of FIG. 11.

FIG. 12 is a section view of FIG. 11.

Figure 13:
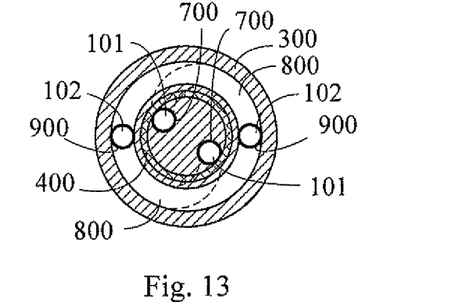
FIG. 13 is a schematic structural view showing that the multiple-route U-type spiral piping structure (800) having two or more than two routes is installed within the columnar thermal conductive body (300), and spirally installed at the periphery of the columnar thermal conductive body (300), and the bottom is concentrated toward the center and connected to the first fluid inlet and outlet terminal (101) through the central piping segment of U-type spiral piping (700), and the outer periphery of the central piping segment of U-type spiral piping (700) of the multiple routes concentrated at the center is installed with the thermal insulating device (400), according to the present invention.

As shown in FIG. 11 and FIG. 12, the main components are as followings:

U-type spiral piping structure (800): made of U-type spiral pipe body for the thermal conductive fluid (111) passing through, wherein the U-type spiral piping structure (800) is composed of a U-type spiral piping structure or used for being installed within the columnar thermal conductive body (300) composed of solid state or colloidal object; the U-type spiral piping of the U-type spiral piping structure (800) is spirally placed near the edge of the periphery of the columnar thermal conductive body (300), in which the first fluid inlet and outlet terminal (101) is placed at the top end of the central piping segment of the U-type spiral piping (700), and directly leads to the bottom of the U-type spiral piping of the U-type spiral piping structure (800) via the central piping segment of U-type spiral piping (700), and the second fluid inlet and outlet terminal (102) is placed at the top end of the piping segment (900) of the second fluid inlet and outlet terminal (102) of the U-type spiral piping structure (800) spirally up its own run;

Thermal insulating device (400): related to a thermal insulating structure constituted by the followings with thermal insulating effects, such as solid, flexible body, or foam, or enveloped colloid, gas, or liquid, or vacuum structure, wherein the U-type spiral piping structure (800) is placed in the columnar thermal conductive body (300), and the center of the columnar thermal conductive body (300) is installed with the central piping segment of U-type spiral piping (700) for leading up to the first fluid inlet and outlet terminal (101), and the central piping segment of U-type spiral piping (700) is directly made of the thermal insulating material or enveloped by the thermal insulating material, or the thermal insulating device (400) is installed between the U-type spiral piping structure (800) around and near the edge of the columnar thermal conductive body (300) spirally up its own run leading to the second fluid inlet and outlet terminal (102) and the piping segment (900) of the second fluid inlet and outlet terminal (102) of the U-type spiral piping structure (800) and the central piping segment of U-type spiral piping (700); by way of the above thermal insulating device (400), the thermal energy loss caused by thermal conduction between the central piping segment of U-type spiral piping (700) leading up to the first fluid inlet and outlet terminal (101), and the U-type spiral piping structure (800) leading to the second fluid inlet and outlet terminal (102) and the central piping segment of U-type spiral piping (700) is substantially reduced;

The structure includes one or more than one of the following structural states:

1) Piping structure assembly: which is provided with the U-type spiral piping structure (800), the piping segment (900) of the second fluid inlet and outlet terminal (102) of the U-type spiral piping structure (800), the central piping segment of U-type spiral piping (700) for connecting to the first fluid inlet and outlet terminal (101), and the thermal insulating device (400) installed at the periphery of the central piping segment of U-type spiral piping (700), so as to configure the piping structure assembly;

2) Columnar structure enveloped by the columnar thermal conductive body (300): which is provided with the columnar thermal conductive body (300) made of thermal conductive material in various geometric cross section shapes such as round, oval, square, rectangular, or star-like shapes, for being served to envelope the U-type spiral piping structure (800), and to envelope the piping segment (900) of the second fluid inlet and outlet terminal (102) of the U-type spiral piping structure (800) and the central piping segment of U-type spiral piping (700) for connecting to the first fluid inlet and outlet terminal (101), as well as to envelope the thermal insulating device (400) installed at the periphery of the central piping segment of U-type spiral piping (700) at the first fluid inlet and outlet terminal (101), so as to configure the columnar structure enveloped by the columnar thermal conductive body (300);

3) Columnar structure utilizing the columnar thermal conductive body (300) having piping therein as the structure member: which is directly made of the columnar thermal conductive body (300), and configured in the structural state having piping therein for being installed with the U-type spiral piping structure (800), the piping segment (900) of the second fluid inlet and outlet terminal (102) of the U-type spiral piping structure (800), the central piping segment of U-type spiral piping (700) for connecting to the first fluid inlet and outlet terminal (101), and the thermal insulating device (400) installed at the periphery of the central piping segment of U-type spiral piping (700) at the first fluid inlet and outlet terminal (101), so as to configure the columnar structure utilizing columnar thermal conductive body (300) having piping therein as the structure member;

FIG. 13 is a schematic structural view showing that the multiple-route U-type spiral piping structure (800) having two or more than two routes is installed within the columnar thermal conductive body (300), and spirally installed at the periphery of the columnar thermal conductive body (300), and the bottom is concentrated toward the center and connected to the first fluid inlet and outlet terminal (101) through the central piping segment of U-type spiral piping (700), and the outer periphery of the central piping segment of U-type spiral piping (700) of the multiple routes concentrated at the center is installed with the thermal insulating device (400), according to the present invention.

Figure 14:
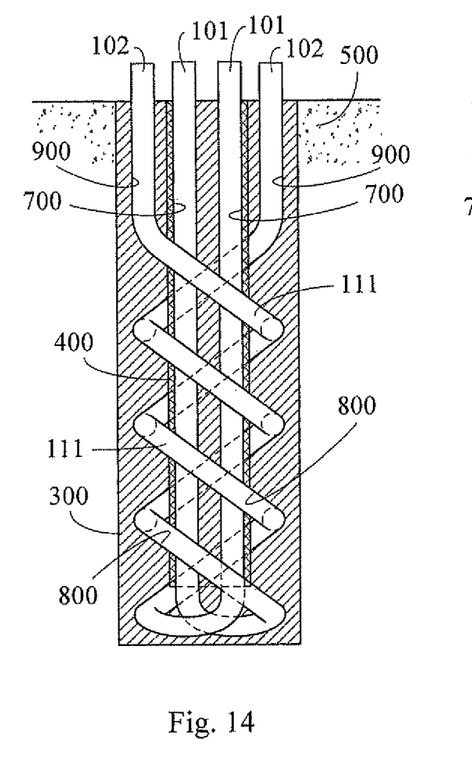
FIG. 14 is a section view of FIG. 13.

FIG. 14 is a section view of FIG. 13

Figure 15:
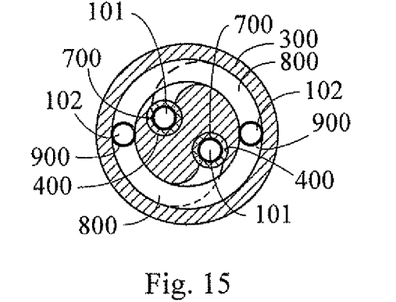
FIG. 15 is a schematic structural view showing that the U-type spiral piping structure (800) having two or more than two routes is installed in the columnar thermal conductive body (300), and spirally arranged at the periphery of the columnar thermal conductive body (300), and the periphery of individual central piping segment of U-type spiral piping (700) of the multiple routes arranged at the center is installed with the thermal insulating device (400), according the present invention.
Figure 16:
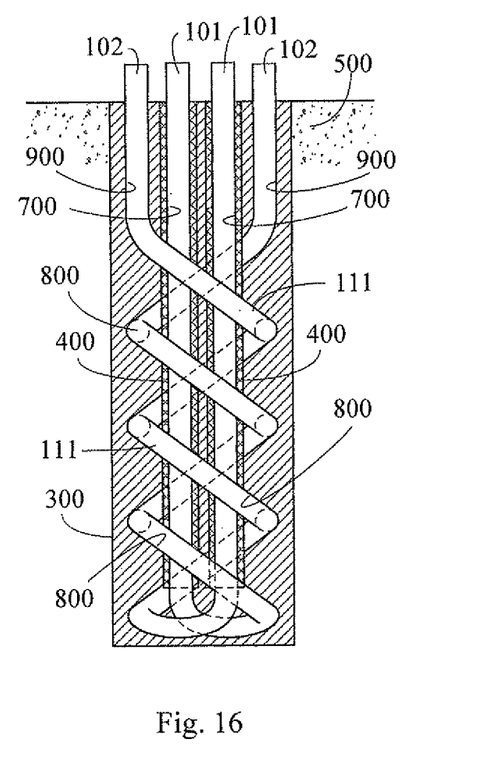
FIG. 16 is a section view of FIG. 15.

As shown in FIG. 13 and FIG. 14, it mainly consists of:

Multiple-route U-type spiral piping: constituted by a U-type spiral piping structure (800) having two or more than two routes and allowing the thermal conductive fluid (111) to pass through, or by multiple sets of the U-type spiral piping structures (800) installed in the columnar thermal conductive body (300) composed of solid state or colloidal object; the U-type spiral piping structure (800) in multiple-route is spirally and annularly installed near the peripheral edge of the columnar thermal conductive body (300), wherein the first fluid inlet and outlet terminal (101) of the U-type spiral piping structure (800) of each route is installed at the top of the spiral piping structure center, and is communicated with the bottom of the U-type spiral piping structure (800) of each route through the central piping segment of U-type spiral piping (700) of each route, and the second inlet and outlet terminal (102) of each route is installed at the top end of the U-type spiral piping structure (800) spirally up its own run via the piping segment (900) of the second fluid inlet and outlet terminal (102) of the U-type spiral piping structure (800) of each route;

Thermal insulating device (400): related to a thermal insulating structure constituted by the followings with thermal insulating effects, such as solid, flexible body, or foam, or enveloped colloid, gas, or liquid, or vacuum structure; the U-type spiral piping structure (800) having two or more than two routes is installed in the columnar thermal conductive body (300), and the central piping segments of U-type spiral piping (700) of the multiple routes are concentrated in the columnar thermal conductive body (300) for upwardly connecting to the first fluid inlet and outlet terminal (101); the central piping segment of U-type spiral piping (700) is directly made of the thermal insulating material or sleeved with the thermal insulating material, or the periphery of the concentrated central piping segments of U-type spiral piping (700) of the multiple routes is installed with the thermal insulating structure (400), by way of the mentioned thermal insulating structure (400), the thermal energy loss caused by thermal conduction between the concentrated central piping segments of U-type spiral piping (700) of the multiple routes, and the U-type spiral piping structure (800) of each route, and the piping segment (900) of the second fluid inlet and outlet terminal (102) of the U-type spiral piping structure (800) of each route is substantially reduced;

The structure includes one or more than one of the following structural states:

1) Piping structure assembly: which is provided with the multiple-route U-type spiral piping composed of the U-type spiral piping structure (800) having two or more than two routes and the piping segment (900) of the second fluid inlet and outlet terminal (102) of the U-type spiral piping structure (800), and the central piping segment of U-type spiral piping (700) of each route is concentrated adjacent installed at the axial center, and the thermal insulating device (400) is installed at the periphery of the central piping segment of U-type spiral piping (700), or the central piping segment of U-type spiral piping (700) of each route is directly made of thermal insulating material, so as to configure the piping structure assembly;

2) Columnar structure enveloped by the columnar thermal conductive body (300): which is provided with the columnar thermal conductive body (300) made of the thermal conductive material in various geometric cross section shapes such as round, oval, square, rectangular, or star-like shapes, for being served to envelope the U-type spiral piping structure (800) having two more or than two routes and the piping segment (900) of the second fluid inlet and outlet terminal (102) of the U-type spiral piping structure (800), and to envelope the thermal insulating device (400) installed at the periphery of the central piping segments of U-type spiral piping (700) concentrated adjacent installed at the axial center, so as to configure the columnar structure enveloped by the columnar thermal conductive body (300) (as shown in FIG. 13 and FIG. 14); or the periphery of individual central piping segment of U-type spiral piping (700) of the multiple routes concentrated adjacent installed at the axial center is respectively installed with the thermal insulating device (400), or the individual central piping segment of U-type spiral piping (700) is directly made of the thermal insulating material, so as to configure the columnar structure enveloped by the columnar thermal conductive body (300) (as shown in FIG. 15, which is a schematic structural view showing that the U-type spiral piping structure (800) having two or more than two routes is installed in the columnar thermal conductive body (300), and spirally arranged at the periphery of the columnar thermal conductive body (300), and the periphery of individual central piping segment of U-type spiral piping (700) of the multiple routes arranged at the center is installed with the thermal insulating device (400), according the present invention; and FIG. 16 is a section view of FIG. 15);

3) Columnar structure utilizing the columnar thermal conductive body (300) having piping therein as the structure member: which is directly made of the columnar thermal conductive body (300), and configured in the structural state having piping therein for being installed with the multiple-route spiral piping composed of the U-type spiral piping structure (800) having two or more than two routes, including the piping segment (900) of the second fluid inlet and outlet terminal (102) of the U-type spiral piping structure (800), the central piping segments of U-type spiral piping (700) of each route which connects to the first fluid inlet and outlet terminal (101) being concentrated adjacent installed at the axial center, and the thermal insulating device (400) installed at the periphery of the central piping segment of U-type spiral piping (700), so as to configure the columnar structure utilizing the columnar thermal conductive body (300) having piping therein as the structure member.

Figure 17:
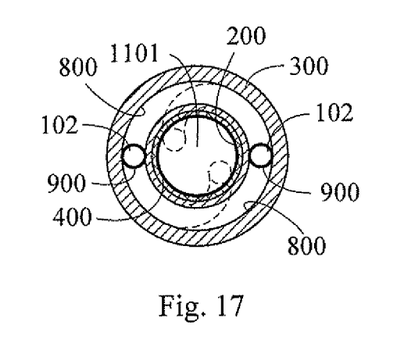
FIG. 17 is a schematic structural view showing that the U-type spiral piping structure (800) having two or more than two routes is installed in the columnar thermal conductive body (300) for being installed nearby the peripheral edge of the columnar thermal conductive body (300), the center of the columnar thermal conductive body (300) is installed with the common piping (200) with a larger diameter, the bottom of the multiple-route U-type spiral piping structure (800) is communicated with the bottom of the common piping (200), and the thermal insulating structure is installed at the outer periphery of the common piping (200), according to the present invention.

FIG. 17 is a schematic structural view showing that the U-type spiral piping structure (800) having two or more than two routes is installed in the columnar thermal conductive body (300) for being installed nearby the peripheral edge of the columnar thermal conductive body (300), the center of the columnar thermal conductive body (300) is installed with the common piping (200) with a larger diameter, the bottom of the multiple-route U-type spiral piping structure (800) is communicated with the bottom of the common piping (200), and the thermal insulating structure is installed at the outer periphery of the common piping (200), according to the present invention.

Figure 18:
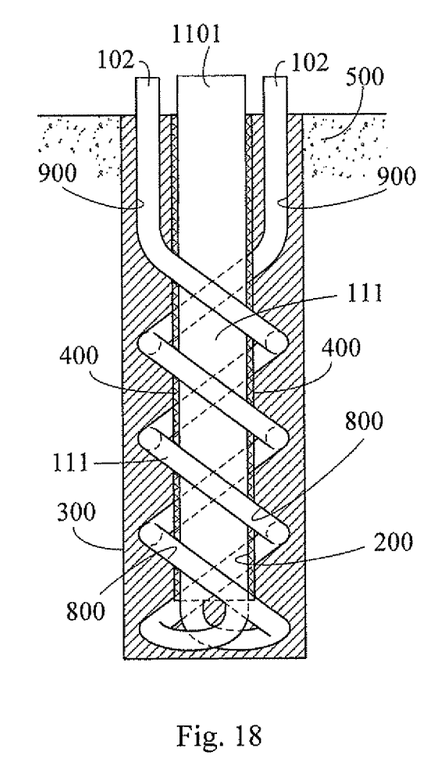
FIG. 18 is a section view of FIG. 17.

FIG. 18 is a section view of FIG. 17.

As shown in FIG. 17 and FIG. 18, it mainly consists of:

Multiple-route U-type spiral piping: constituted by the U-type spiral piping structure (800) having two or more than two routes and allowing the thermal conductive fluid (111) to pass through, or by multiple sets of the U-type spiral piping structures (800) installed in the columnar thermal conductive body (300) composed of solid state or colloidal object; the U-type spiral piping structure (800) in multiple-route is spirally and annularly installed at the periphery of the columnar thermal conductive body (300), and each route has the piping segment (900) of the second fluid inlet and outlet terminal (102) of the U-type spiral piping structure (800) for connecting to the corresponding second fluid inlet and outlet terminal (102), and the bottom of the U-type spiral piping structure (800) of each route is communicated to the common piping (200), and the common piping (200) is installed at the center of the U-type spiral piping structure (800), and the top thereof is connected to the shared first fluid inlet and outlet terminal (1101);

Thermal insulating device (400): related to a thermal insulating structure constituted by the followings with thermal insulating effects, such as solid, flexible body, or foam, or enveloped colloid, gas, or liquid, or vacuum structure; the U-type spiral piping structure (800) of each route is installed in the columnar thermal conductive body (300), and the common piping (200) is installed at the axial center of the columnar thermal conductive body (300), and the top thereof is connected to the shared first fluid inlet and outlet terminal (1101), and the piping segment of the common piping (200) of the U-type spiral piping is directly made of the thermal insulating material or sleeved with the thermal insulating material, or the thermal insulating structure (400) is installed between the U-type spiral piping structure (800) of each route and the piping segment (900) of the second fluid inlet and outlet terminal (102) of the U-type spiral piping structure (800) of each route, and the piping segment of the common piping (200) of the U-type spiral piping, by way of the mentioned thermal insulating structure (400), the thermal energy loss caused by thermal conduction between the common piping (200), and the U-type spiral piping structure (800) and the piping segment (900) of the second fluid inlet and outlet terminal (102) of the U-type spiral piping structure (800) of each route is substantially reduced;

The structure includes one or more than one of the following structural states:

1) Piping structure assembly: which is provided with the multiple-route U-type spiral piping composed of the U-type spiral piping structure (800) having two or more than two routes and the piping segment (900) of the second fluid inlet and outlet terminal (102) of the U-type spiral piping structure (800), and the common piping (200) allowing the bottom of the U-type spiral piping structure (800) of each route to be communicated to, and the shared first fluid inlet and outlet terminal (1101) enabling the common piping (200) to upwardly connected to, and the thermal insulation device (400) installed on the common piping (200), or the common piping (200) directly made of thermal insulating material, so as to configure the piping structure assembly;

2) Columnar structure enveloped by the columnar thermal conductive body (300): which is provided with the columnar thermal conductive body (300) made of the thermal conductive material in various geometric cross section shapes such as round, oval, square, rectangular, or star-like shapes, for being served to envelope the multiple-route U-type spiral piping composed of the U-type spiral piping structure (800) having two more or than two routes and the piping segment (900) of the second fluid inlet and outlet terminal (102) of the U-type spiral piping structure (800), and to envelope the common piping (200) having its bottom communicated with the bottom of the U-type spiral piping structure (800) of each route and having its top communicated with the shared first fluid inlet and outlet terminal (1101), and to envelope the thermal insulating device (400) installed on the common piping (200), so as to configure the columnar structure enveloped by the columnar thermal conductive body (300);

3) Columnar structure utilizing the columnar thermal conductive body (300) having piping therein as the structure member: which is directly made of the columnar thermal conductive body (300), and configured in the structural state having piping therein for being installed with the multiple-route spiral piping structure (800) composed of the U-type spiral piping structure (800) having two or more than two routes and the piping segment (900) of the second fluid inlet and outlet terminal (102) of the U-type spiral piping structure (800), and the common piping (200) installed at the center of the U-type spiral piping structure (800) and communicated with the bottom of the U-type spiral piping structure (800) of each route, and the thermal insulating device (400) installed thereon, so as to configure the columnar structure utilizing the columnar thermal conductive body (300) having piping therein as the structure member.

The invention claimed is:

1. A pipe member arrangement including a plurality of piping sections arranged to be installed within a natural thermal storage body (500), the natural thermal storage body including one of a shallow surface of the earth, a body of water, and artificial objects in a solid, gaseous, or liquid state, and the plurality of piping sections being constructed so that central piping segment (700) is thermally insulated from a spiral piping segment (800) of each of the plurality of the piping sections so as to prevent thermal energy loss because of thermal conduction between adjacent central piping segments and spiral piping segments of the piping sections on a same side when a thermal conductive fluid (111) with a temperature difference passes through, wherein:

a number of the central piping segments (700) is at least two, the central piping segments (700) are linear, and a first end of each of the central piping segments (700) includes a first fluid inlet/outlet terminal (101) at a first end, a number of the spiral piping segments (800) is at least two, and a first end of each of the spiral piping segments (800) includes a second fluid inlet/outlet terminal (102), a second end of each of the at least two central piping segments (700) is joined to and in communication with a second end of each of the at least two spiral piping segments (800), the at least two central piping segments (700) being arranged to extend into the natural thermal storage body (500) from said first fluid inlet/outlet terminals (101) at the first ends of the respective central piping segments (700) to the second ends of the respective central piping segments (700) within the natural thermal storage body (500), the at least two spiral piping segments (800) each has a spiral structure that separately wraps around the at least two central piping segments (700) along different spiral paths to form multiple staggered upwardly extending spiral piping segments, the at least two central piping segments (700) being situated inside the multiple staggered upwardly extending spiral piping segments formed by the at least two spiral piping segments (800), and the central piping segments (700) being thermally insulated from the spiral piping segments (800) for reducing thermal energy loss caused by thermal conduction between the thermal conduction fluid (111) in said central and spiral piping segments.

2. A pipe member arrangement as claimed in claim 1, wherein the central piping segments (700) are thermally insulated from the spiral piping segments (800) by thermal insulation (400) that extends around a plurality of said central piping segments (700) between said central piping segments (700) and said spiral piping segments (800).

3. A pipe member arrangement as claimed in claim 1, wherein the central piping segments (700) are thermally insulated from the spiral piping segments (800) by thermal insulation (400) that extends around individual ones of said central piping segments (700).

4. A pipe member arrangement as claimed in claim 1, further comprising a columnar thermal conductive body (300) made of thermal conductive material and extending into the natural thermal storage body (500), wherein the columnar thermal conductive body (300) has a columnar structure with various geometric shape sections, for enveloping the plurality of piping sections and thermal insulation (400).

5. A pipe member arrangement as claimed in claim 2, wherein the thermal insulation (400) includes one of a solid body, a flexible body, a foam body, and an enveloped colloid, gas, liquid, or vacuum structure.

6. A pipe member arrangement as claimed in claim 1, further comprising non-spiral piping segments (900) extending between the spiral piping segments (800) and the second fluid inlet/outlet terminals (102).

7. A pipe member arrangement as claimed in claim 1, wherein the central piping segments (700) are thermally insulated from the spiral piping segments (800) by a material of the central piping segments (700).

8. A pipe member arrangement as claimed in claim 3, wherein the thermal insulation (400) includes one of a solid body, a flexible body, a foam body, and an enveloped colloid, gas, liquid, or vacuum structure.

* * * * *